United States Patent [19]
Tanaka

[11] Patent Number: 5,128,983
[45] Date of Patent: Jul. 7, 1992

[54] TRANSACTION PROCESSING TERMINAL CAPABLE OF LOADING DATA EXTERNALLY TRANSMITTED AND TRANSACTION PROCESSING SYSTEM INCLUDING THE SAME

[75] Inventor: Toshifumi Tanaka, Kyoto, Japan

[73] Assignee: Omron Tateisi Electronics Company, Kyoto, Japan

[21] Appl. No.: 539,308

[22] Filed: Jun. 18, 1990

Related U.S. Application Data

[63] Continuation of Ser. No. 254,927, Oct. 7, 1988, abandoned.

[30] Foreign Application Priority Data

Oct. 13, 1987 [JP] Japan .................................. 62-258958

[51] Int. Cl.⁵ .................... H04M 11/00; H04M 17/00
[52] U.S. Cl. ......................................... 379/91; 379/144
[58] Field of Search ..................... 379/91, 58, 93, 144

[56] References Cited

U.S. PATENT DOCUMENTS

| | | | |
|---|---|---|---|
| 4,367,374 | 1/1983 | Serrano | 379/93 |
| 4,503,288 | 3/1985 | Kessler | 379/67 |
| 4,685,123 | 8/1987 | Hsia et al. | 379/93 |
| 4,723,268 | 2/1988 | Newell et al. | 379/98 |
| 4,724,521 | 2/1988 | Carron et al. | 364/300 |

Primary Examiner—James L. Dwyer
Assistant Examiner—Wing F. Chan
Attorney, Agent, or Firm—Dickstein, Shapiro & Morin

[57] ABSTRACT

A CAT and a telephone are connected to a single telephone line. Considering a case in which a menu=0 and the CAT is in an automatic call incoming mode, when data transmission is made from a host computer, a line is automatically connected to the CAT, so that data transmitted from the host computer is stored in a memory in the CAT. On the other hand, when the CAT is in the idle mode, the CAT does not answer and telephone conversations can be made by the telephone connected to the telephone line.

3 Claims, 5 Drawing Sheets

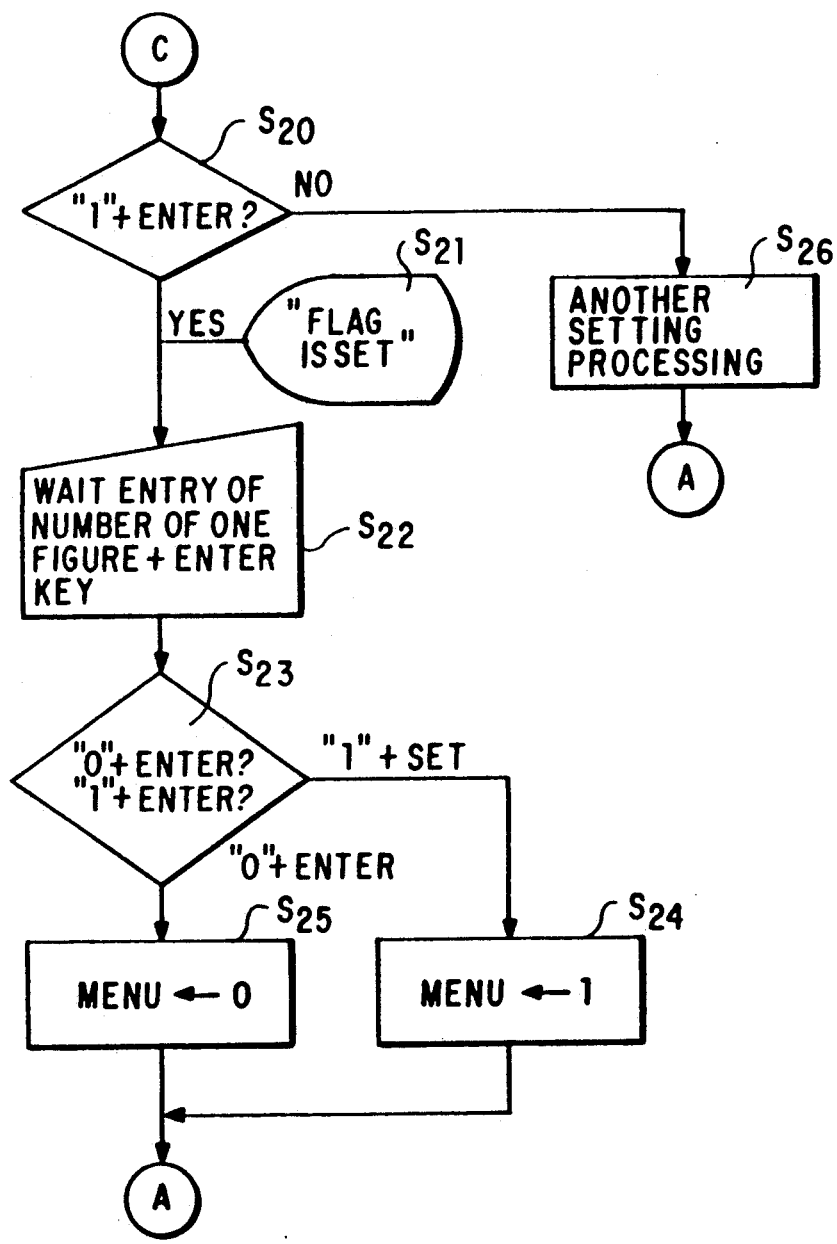

TRANSACTION PROCESSING TERMINAL CAPABLE OF LOADING DATA EXTERNALLY TRANSMITTED AND TRANSACTION PROCESSING SYSTEM INCLUDING THE SAME

This application is a continuation of application Ser. No. 07/254,927, filed Oct. 7, 1988, now abandoned.

BACKGROUND OF THE INVENTION

1. Field of the Invention

The present invention relates generally to transaction processing terminals, and more particularly, to a transaction processing terminal which can be connected to a telecommunication line connected to a communication terminal and a transaction processing system including a transaction processing terminal.

2. Description of the Prior Art

Recently, stores have begun using credit authorization terminals (referred to as CAT's hereinafter) for performing credit card authorization processing, that is, making an inquiry to a host as to whether or not payment can be made using the credit card and displaying the result of the inquiry.

In conventional CATS, both a program for performing the above-described card authorization processing and data are necessary for such a program for performing card authorization processing are stored in a memory. Known methods for storing the program and the data in this memory are as follows:

(1) The entire program is stored in a ROM (read-only memory) in the CAT. A table is constructed by a key operation or by transmitting data to be stored from a host through a telecommunication line.

(2) Only a basic portion of the program is stored in the ROM, and an application program which may be changed for each customer is stored in a RAM (random access memory). The application program is transmitted through the telecommunication line, and the table is set in the same manner as for case (1).

In above case (2), it is not important to transmit the application program by key operation because to do so is almost impossible. However, it is important to transmit the application program through the telecommunication line. In addition, techniques for doing so comprise a method for dialing from the CAT to the host and a method for dialing from the host to the CAT. Recently, the latter is preferable in that an extra burden is not imposed on an operator on the side of the CAT and in that the load of the host can be averaged.

The conventional CAT and a telephone may be connected to a single telecommunication line. In such case, when a calling signal externally applied is received, it cannot be determined whether the calling signal is a call for constructing the above-described program or the like or a call for general telephone conversations. Therefore, in order to construct the program or the like by transmission from the host, the line must be preconnected only to the CAT before the incoming call from the host is received. However, in the case of such connection, when transmission is not made from the host, the above-described telephone cannot respond to an outside call for general conversation because it is not connected to the line, so that utilization of the line is limited.

SUMMARY OF THE INVENTION

An object of the present invention is to provide a transaction processing terminal which is capable of constructing a program or the like in a memory by transmission from a host and which is moreover capable of effectively utilizing a telecommunication line and to provide a transaction processing system which includes such a transaction processing terminal.

Briefly stated, the present invention is directed to a transaction processing terminal which can be connected to a telecommunication line connected to a communication terminal having a communication function. The transaction processing terminal comprises storing means for storing data, mode selecting means for selecting an automatic call incoming mode or idle mode via an output signal generated thereby, line connecting means for connecting the transaction processing terminal to the telecommunication line, and control means for performing a control function to allow line connection by the line connecting means in response to an automatic call incoming mode selecting output from the mode selecting means and an outside calling signal such that data transmitted through the telecommunication line can be stored in the storing means and to prohibit line connection by the line connecting means in response to an outside calling signal in selection of the automatic call incoming mode by the mode selecting means such that communication is permitted by the communication terminal.

In accordance with another aspect of the present invention, the host is connected to the telecommunication line. The host comprises transmitting means for transmitting a calling signal and required data to the transaction processing terminal.

According to the present invention, when the automatic call incoming mode is selected, line connection is allowed such that data transmitted through the telecommunication line can be stored in response to the calling signal from the exterior, so that a program or the like can be constructed in a memory by transmission from the host. On the other hand, when the idle mode is selected, line connection of the transaction processing terminal is restricted such that communication is permitted by the communication terminal connected to the telecommunication line in response to the outside calling signal from the exterior, so that the telecommunication line can be effectively utilized.

The foregoing and other objects, features, aspects and advantages of the present invention will be more fully apparent from the following detailed description of the present invention when taken in conjunction with the accompanying drawings.

BRIEF DESCRIPTION OF THE DRAWINGS

FIG. 5A to 5C are flow charts for explaining an operation according to one embodiment of the present invention.

DESCRIPTION OF THE PREFERRED EMBODIMENTS

In the following embodiment, a CAT will be described. However, it should be noted that the present invention is not limited to the same. For example, the present invention can provide a transaction processing terminal having a data transmission function between the transaction processing terminal and another apparatus through a telecommunication line.

Figure 1:
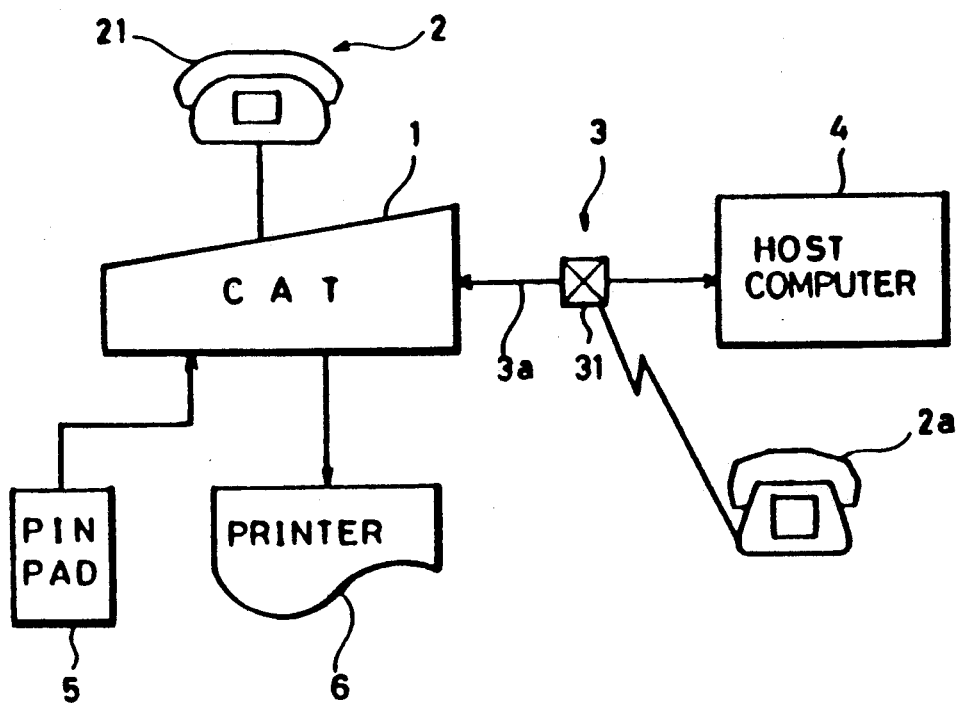
FIG. 1 is a diagram showing a structure of a transaction processing system to which a CAT according to one embodiment of the present invention is applied.

FIG. 1 is a diagram showing a structure of a transaction processing system to which a CAT according to one embodiment of the present invention is applied. In FIG. 1, the CAT and a telephone 2 are connected to a telephone line 3a. The CAT 1 can be connected to a host computer 4 through a telephone line network 3 including an exchange 31. The host computer 4 has a function of performing card authorization processing in response to an inquiry from the CAT 1 as well as a function of constructing a required program and data in the CAT 1. A PIN pad 5 and a printer 6 are connected to the CAT through a cable. The PIN pad 5 is used for customer's entering his or her identification number when a credit transaction is performed. The printer 6 is used for printing a slip or the like.

Description is now made of a schematic operation of the transaction processing system shown in FIG. 1. When a telephone call is made from an external telephone 2a, the telephone 2 generates a ring back tone in response to a calling signal transmitted through the telephone line 3a. An operator in a store picks up a transceiver 21 of the telephone 2 so that telephone conversations can be made between the telephone 2 and the telephone 2a. When the operator in the store has previously known the time when a program or the like is transmitted by the host computer 4, the operator sets the CAT 1 to an automatic call incoming mode before such transmission time. At this time, when a telephone call is made from the host computer 4, the CAT 1 enters an automatic call incoming state, to store data transmitted through the telephone line 3a in the memory in the CAT 1. Whether or not the automatic call incoming mode is selected, the operator can set the CAT 1 such that automatic call incoming is achieved by setting the menu through a given key operation.

Figure 2:
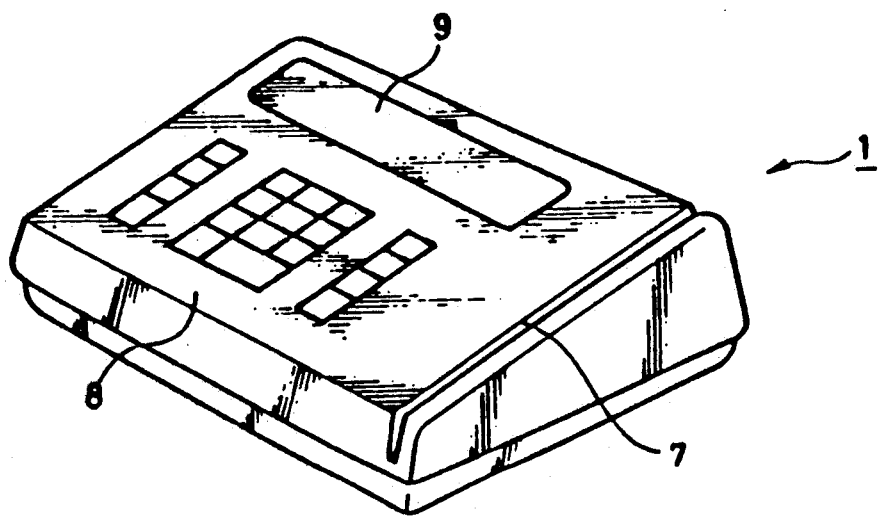
FIG. 2 is a perspective view showing the appearance of the CAT shown in FIG. 1.

FIG. 2 is a perspective view showing the appearance of the CAT shown in FIG. 1. In FIG. 2, the CAT is provided with a card reader 7, a keyboard 8 and a display 9. The card reader 7 is used for reading out card data from a credit card of a customer. The keyboard 8 includes various keys shown in FIG. 3. The display 9 is used for displaying a guidance message for an operation, data entered from the keyboard 8 and the result of authorization.

Figure 3:
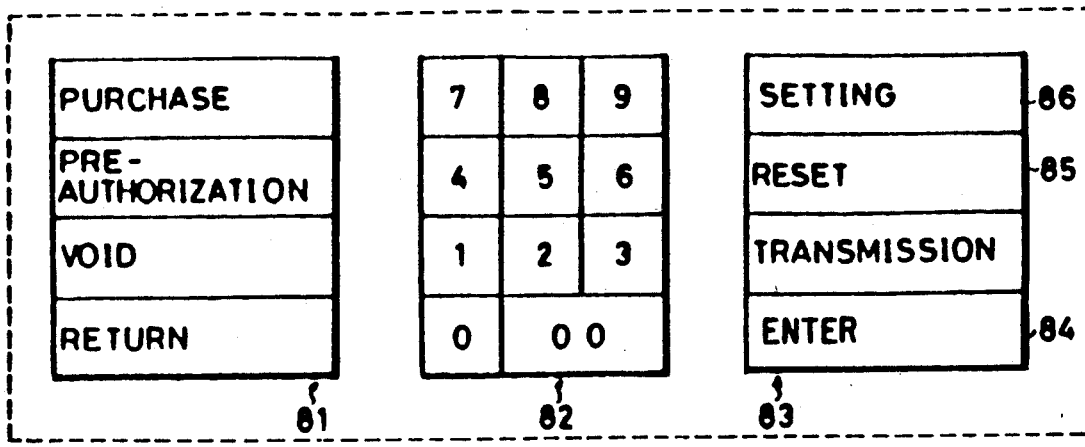
FIG. 3 is a diagram showing the key arrangement of a keyboard shown in FIG. 2.

FIG. 3 is a diagram showing the key arrangement of the keyboard shown in FIG. 2. In FIG. 3, the keyboard 8 is provided with a transaction key 81, a ten-key 82 and a function key 83. The transaction key 81 is used for indicating the kind of transaction, which comprises a purchase key indicating purchasing processing, a pre-authorization key indicating pre-authorization, a void key indicating voiding of transaction, and a return key indicating returning processing. The ten-key 82 is used for entering data indicating the amount of commodities purchased by a customer and a commodity code at the time of transaction while entering various section codes as described below in an idle state. The function key 83 comprises a enter key 84, a reset key 85 and a setting key 86. The enter key 84 is operated when the above described section codes are entered. The reset key 85 is used for indicating a resetting operation. The setting key 86 is used for indicating setting of a flag (MENU) and a call incoming instruction. In this embodiment, the automatic call incoming mode is set by operations of the setting key 86, one key in the ten-key 82 and the enter key 84.

Figure 4:
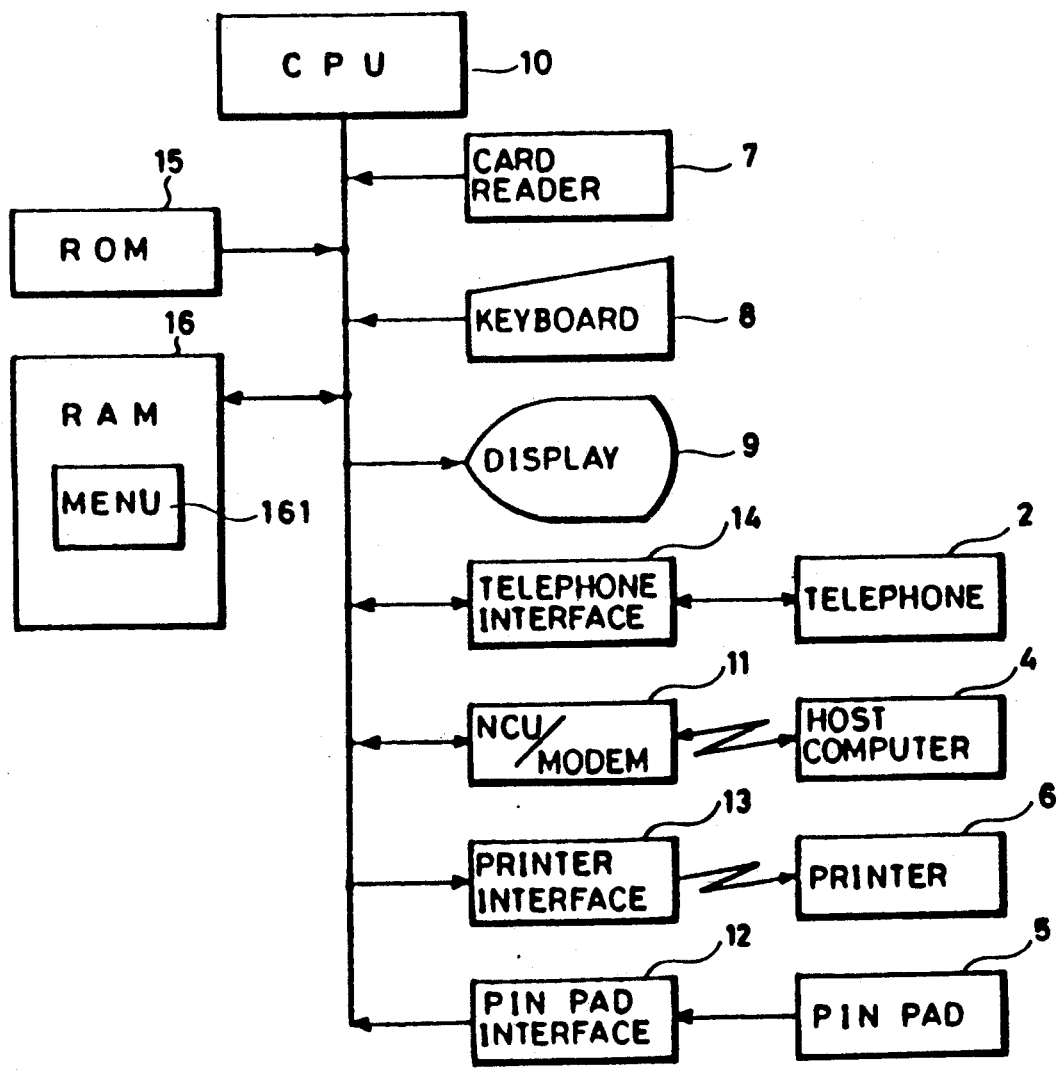
FIG. 4 is a schematic block diagram showing an electrical structure of the CAT according to one embodiment of the present invention.

FIG. 4 is a schematic block diagram showing an electrical structure of the CAT according to one embodiment of the present invention. In FIG. 4, the CAT is provided with a CPU (central processing unit) 10. Connected to the CPU 10 are the card reader 7, the key board 8 and the display 9 as described above, as well as an NCU/MODEM 11, a PIN pad interface 12, a printer interface 13, a telephone interface 14, a ROM 15 and a RAM 16. The NCU/MODEM 11 is used for transmitting data between the CPU 10 and a host computer 4, that is, connecting and disconnecting a telephone line as well as modulating and demodulating a signal transmitted through the telephone line. The PIN pad interface 12 is used for connecting the CPU 10 to a PIN pad 5. The printer interface 13 is used for connecting the CPU 10 to a printer 6. The telephone interface 14 is used for connecting the CPU 10 to a telephone 2. The ROM 15 is used for storing an operation program of the CPU 10 based on flow charts of FIGS. 5A to 5C as described below. The RAM 16 comprises a flag storage area 161 for storing a flag (MENU) indicating whether the operation mode is the automatic call incoming mode or the idle mode. Considering a case in which a calling signal is received in an idle state, if the MENU is "1", automatic call incoming is achieved. On the other hand, if the MENU is "0", the CAT does not answer and the line can be used for general conversations. In addition, the RAM 16 comprises a storage area for storing a program and table data transmitted through the host computer 4.

Description is now made regarding general operation of the CAT. Credit transaction processing performed by the CAT comprises pre-authorizating processing, purchasing processing, voiding processing, returning processing and the like. The pre-authorization processing is used for making an inquiry to a host computer before purchasing commodities as to whether a credit card is accepted and as to the amount which can be charged on the credit card. The purchasing processing is used for entering a commodity code of a commodity purchased with the credit card and the amount of the commodity, transmitting the same to a host computer and registering the same at the host computer. The voiding processing and the returning processing are used for clearing data concerning a purchased commodity once registered at the host computer.

Figure 5A:
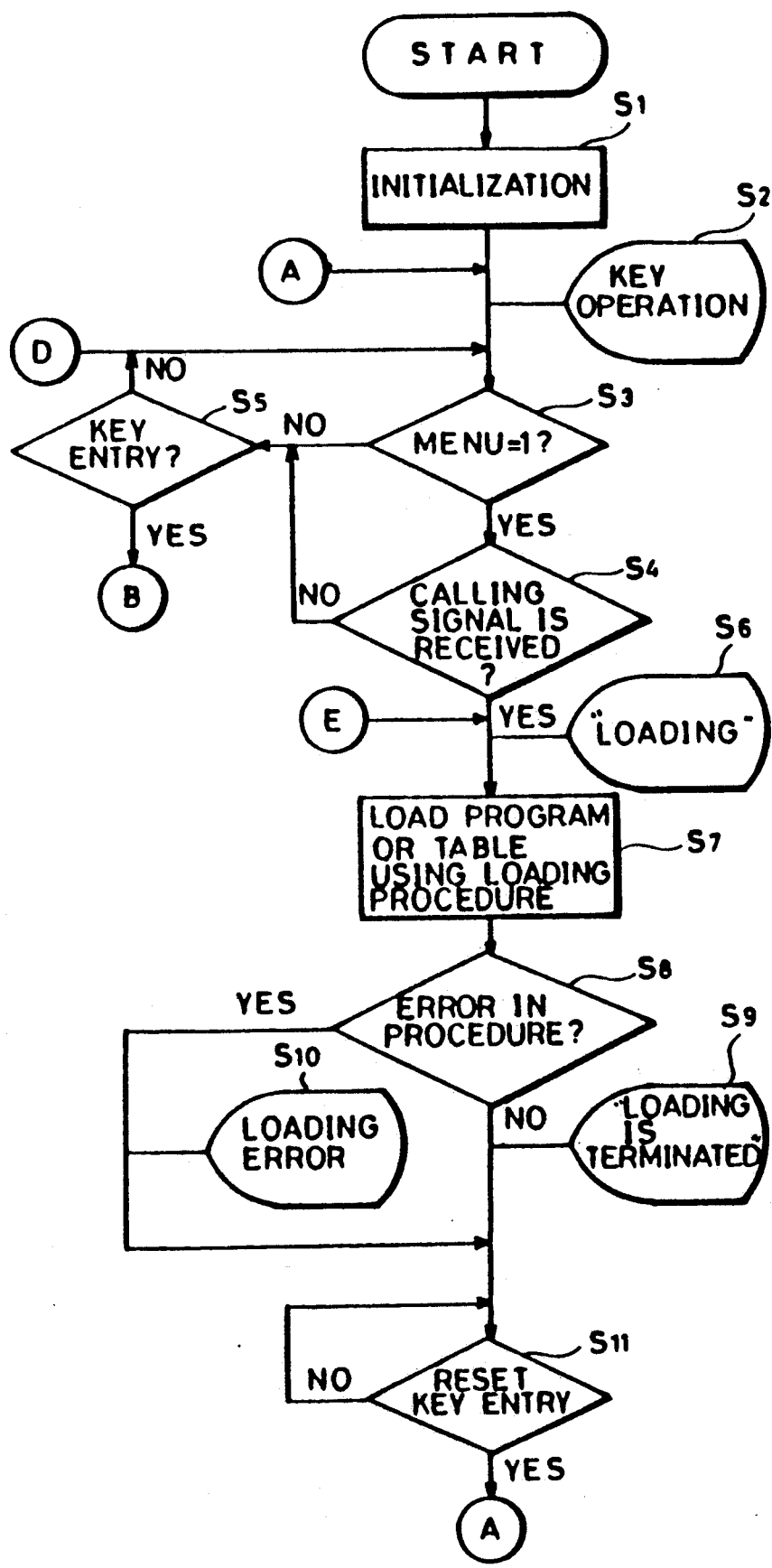
Figure 5B:
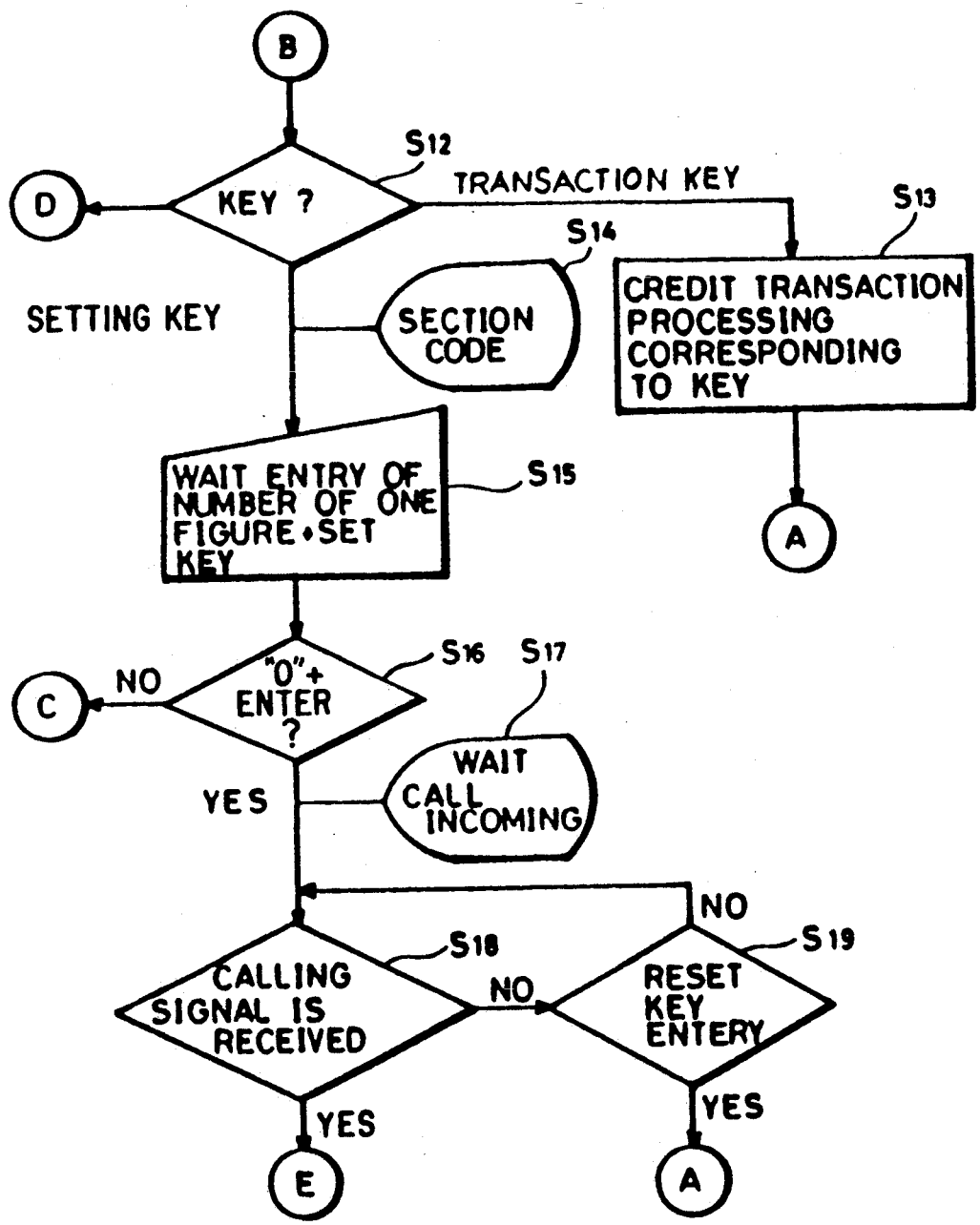

FIGS. 5A to 5C are flow charts illustrating operation according to one embodiment of the present invention. Referring now to FIGS. 1 to 5C, the operation according to one embodiment of the present invention will be described in detail.

In the step S1 (referred to as S1 in the figure), the CPU 10 initializes a memory or the like. Consequently, the CAT enters an idle state. Subsequently, in the step S2, the CPU 10 instructs the display 9 to indicate that any key should be operated. In the step S3, the CPU 10 determines whether or not the MENU is "1". In the step S4, the CPU 10 determines whether or not a calling signal is received. In the step S5, the CPU 10 determines whether or not any key in the keyboard 8 is operated. If the MENU is "1" and when the calling signal is received, the program proceeds to the step S6. On the other hand, if the MENU=0 and entry is provided, the program proceeds to the step S12. In addition, when the MENU is "0" and when key entry is not provided, the CPU 10 repeats the operations in the steps S3 and S5. On this occasion (idle mode, MENU=0) if the calling signal is received through the telephone line 3a, the operator can use telephone 2 for normal conversational use.

Description is now made regarding operation when the MENU equals 1 in the idle state and the calling signal is received. In the step S6, the CPU 10 instructs the display to indicate that data is being loaded. Subsequently, in the step S7, the CPU loads in the RAM 16 a program or table data transmitted from the host computer 4 through the telephone line 3a using the loading procedure. On this occasion, in the step S8, the CPU 10 examines whether or not there is an error in the loading procedure. When there is no error, the CPU instructs the display 9 to indicate that loading is terminated, in the step S9. On the other hand, when there is an error, i.e. when the incoming call is for general use and no downline loading request was made by a host computer, the CPU 10 instructs the display 9 to indicate that there is a loading error, in the step S10. If the loading is terminated, the operator operates the reset key 85. Correspondingly, in the step S11, the CPU 10 determines that the reset key 85 is operated. Consequently, the program is returned to the step S2.

Description is now made regarding operation when it is determined that key entry is provided, in the above described step S5. In the step S12, the CPU 10 determines which key is operated. If and when any key in the transaction key 81 is operated, the CPU 10 performs a credit transaction processing corresponding to the key, in the step S13. After the transaction processing is terminated, the program is returned to the step S2. On the other hand, when the setting key 86 is operated, the CPU 10 instructs the display 9 to indicate that a section code must be entered, in the step S14, and the CPU 10 is in the wait state until a number of one figure is entered from the ten-key 82 and the enter key 84 is operated. The operator operates a "0" key in the ten-key 82 and then operates the enter key 84 when the automatic call incoming mode by the CAT 1 is desired while operating a "1" key in the ten-key 82 and then operating the enter key 84 when setting of the MENU is desired.

If and when the CPU 10 determines that the "0" key and the enter key 84 are operated, in the step S16, the CPU 10 instructs the display 9 to indicate that the CAT waits for an incoming call. Subsequently, in the step S18, the CPU 10 determines whether or not the calling signal is received. In the step S19, the CPU 10 determines whether or not the reset key 85 is operated. If the calling signal is received, the program proceeds to the step S6 and subsequent steps. In these steps, the CPU 10 loads a program or the like. On the other hand, if the calling signal is not received, the CPU 10 is in the wait state until the reset key 85 is operated. When transmission is not made from the host computer 4, the operator operates the reset key 85 to prohibit the automatic call incoming mode by the CAT 1. When the reset key 85 is operated, the program is returned to the step S2.

On the other hand, in the step S15, if and when a key other than the "0" key in the ten-key 82 is operated and then the enter key 84 is operated, the program proceeds to the step S20. In the step S20, the CPU 10 determines whether or not the "1" key and the key 84 are operated. When these keys are operated, the program proceeds to the step S21. In the step S21, the CPU 10 instructs the display 9 to indicate that the flag (MENU) is set. Subsequently, in the step S22, the CPU 10 is in the wait state until a number of one figure is entered from the ten-key 82 and the set key 84 is operated. The operator operates the "1" key in the ten-key 82 and then operates the enter key 84 to set the MENU to 1. On the other hand, the MENU is set to 0 by operating the "0" key and the set key 84. If, however, the "1" key and the enter key 84 are not operated, in the step S20, the program proceeds to the step S26. In the step S26, another setting processing is performed.

As described above, according to the present invention, if the automatic call incoming mode is selected, the program or the like transmitted from the host computer can be loaded in the memory. In addition, even if the automatic call incoming mode is not selected, a state in which call incoming is possible can be achieved by an operation of the setting key 86 and then a key operation. Thus, when the CAT is connected to a telephone which is employed conventionally, the installation costs can be reduced without losing the loading function. Furthermore, when a line is newly installed for only the CAT, an improvement is achieved in the operating capability of the operator which operates the CAT for loading.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A transaction processing terminal connectable to a telecommunication line connected to a communication terminal having a communication function, comprising:
   a plurality of transaction keys,
   storing means for storing data,
   mode selecting means for providing (i) an automatic call incoming mode selecting output to select an automatic call incoming operation mode for said transaction processing terminal and (ii) an idle mode selecting output to select an idle operation mode,
   line connecting means for connecting said transaction processing terminal to said communication line, and
   control means for (i) enabling line connection of said transaction processing terminal to said communication line by said line connecting means in response to (a) said automatic call incoming mode selecting output and (b) an outside calling signal to allow data transmitted through said telecommunication line to be stored in said storing means and for prohibiting said line connection in response to said outside calling signal in said idle mode selecting output when said control means is set to ignore said outside calling signal to permit communication by said communication terminal and (ii) enabling data communication in said idle mode when said control means is set to respond to said outside calling signal.

2. The transaction processing terminal according to claim 1, further comprising entering means for entering a key signal for automatically answering an incoming call independently of whether an automatic call incoming mode is selected by said mode selecting means, said control means being responsive to said key signal from said entering means and the outside calling signal for performing control to allow line connection by said line connecting means.

3. A transaction processing system, comprising: a host; and a transaction processing terminal connectable to said host through a telecommunication line, wherein said telecommunication line is connectable to a communication terminal including a telephone and to said transaction processing terminal in a shared manner, said host comprising transmitting means for transmitting a calling signal and required data to said transaction processing terminal, said transaction processing terminal comprising:
(a) a plurality of transaction keys,
(b) storing means for storing data transmitted through said telecommunication line,
(c) mode selecting means for providing (i) an automatic call incoming mode selecting output to select an automatic call incoming operation mode for said transaction processing terminal and (ii) an idle mode selecting output to select an idle operation mode,
(d) line connecting means for connecting said transaction processing terminal to said telecommunication line, and
(e) control means for (i) enabling line connection of said transaction processing terminal to said telecommunication line by said line connecting means in response to (a) said automatic call incoming mode selecting output and (b) an outside calling signal transmitted through said telecommunication line to allow data transmitted through said telecommunication line to be stored in said storing means and for prohibiting said line connection in response to said outside calling signal transmitted through said telecommunication line in said idle mode selecting output when said control means is set to ignore said outside calling signal to permit communication by said communication terminal and (ii) for enabling transaction processing in said idle mode.

* * * * *